US008738044B1

(12) United States Patent
Shetty et al.

(10) Patent No.: US 8,738,044 B1
(45) Date of Patent: May 27, 2014

(54) METHOD AND SYSTEM FOR PAGING A MOBILE STATION

(75) Inventors: Manoj Shetty, Overland Park, KS (US); Sachin R. Vargantwar, Overland Park, KS (US); Bhagwan Khanka, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1074 days.

(21) Appl. No.: 12/501,148

(22) Filed: Jul. 10, 2009

(51) Int. Cl.
*H04W 4/08* (2009.01)

(52) U.S. Cl.
USPC ............................................. 455/458; 340/7.1

(58) Field of Classification Search
CPC ....... H04W 68/00; H04W 4/12; H04W 48/16; H08B 5/228; H04M 11/022
USPC .................... 455/458, 466, 515; 340/7.1, 7.28
See application file for complete search history.

(56) References Cited

U.S. PATENT DOCUMENTS

| | | | |
|---|---|---|---|
| 6,111,865 A | 8/2000 | Butler et al. | |
| 6,393,295 B1 | 5/2002 | Butler et al. | |
| 6,421,540 B1 | 7/2002 | Gilhousen et al. | |
| 6,687,285 B1 | 2/2004 | Jou | |
| 6,832,094 B2 | 12/2004 | Butler et al. | |
| 7,031,731 B2 | 4/2006 | Gau et al. | |
| 7,072,674 B1 * | 7/2006 | Mademann | 455/458 |
| 2002/0090960 A1 * | 7/2002 | Laroia et al. | 455/458 |
| 2008/0268877 A1 * | 10/2008 | Harris | 455/458 |
| 2009/0182871 A1 * | 7/2009 | Gupta et al. | 709/224 |

FOREIGN PATENT DOCUMENTS

WO  WO 93/23965 A1  11/1993

* cited by examiner

*Primary Examiner* — Phuoc H Doan

(57) ABSTRACT

A two-stage method is used to page a target mobile station. A wireless network transmits an initial page message into a plurality of wireless coverage areas (e.g., the wireless coverage areas defined by a paging zone) that includes the target mobile station's last reported location. The initial page message is received by a plurality of mobile stations, which then transmit a plurality of responses. The plurality of responses includes a target response from the target mobile station. The wireless network determines the target wireless coverage area that received the target response and then transmits a supplemental page message into the target wireless coverage area. The initial page message may be a very short message, such as a page indicator, that does not identify the target mobile station. The supplemental page message may be a longer message that identifies the target mobile station and the reason for the page.

20 Claims, 3 Drawing Sheets

METHOD AND SYSTEM FOR PAGING A MOBILE STATION

BACKGROUND

A wireless telecommunications network may use a paging channel to transmit control information to one or more mobile stations. For example, the network may receive a request to connect an incoming call to a target mobile station. In response, the network may page the target mobile station by transmitting a page message in the paging channel. The page message may identify the target mobile station as the intended recipient. If the target mobile station receives the page message, the target mobile station may respond by transmitting a page response message in an access channel.

However, the paging channel in a given wireless coverage area (such as a cell or sector) may be a broadcast channel that is monitored by all of the mobile stations operating in that wireless coverage area. Consequently, even though a page message may be intended for one specific mobile station, the page message may be received by multiple mobile stations. In order to use the paging channel more efficiently, the paging channel may be divided into multiple time slots and different mobile stations may monitor different time slots. As a result, the network may deliver a more focused page message by transmitting the page message in the time slot that is being monitored by the mobile station intended to receive it.

Wireless networks, however, are typically less focused with respect to where to transmit a page message intended for a specific mobile station. In order to reach a specific mobile station, the network may refer to that mobile station's last reported location (e.g., the cell or sector that most recently received a registration message or other message transmitted by the mobile station). However, if the page message is transmitted into only the cell or sector corresponding to the mobile station's last reported location, the intended mobile station may not receive the page message. This is because the mobile station may have moved into a different cell or sector since its location was last reported.

In order to account for the inherent mobility of mobile stations, a wireless network may transmit a page message that is intended for a specific mobile station into multiple cells or sectors, for example, a group of cells or sectors that are defined by a "paging zone." The paging zone may include the cell or sector corresponding to the intended mobile station's last reported location, as well as other cells or sectors where the mobile station may have moved to since the mobile station's location was last reported.

OVERVIEW

In a first principal aspect, an exemplary embodiment provides a method of paging a target mobile station. In accordance with the method, an initial page message is transmitted into a plurality of wireless coverage areas. A plurality of responses to the initial page message is received from a plurality of mobile stations. The plurality of responses includes a target response from the target mobile station. The target wireless coverage area from which the target response was received is determined. After receiving the target response, a supplemental page message is transmitted into the target wireless coverage area.

In a second principal aspect, an exemplary embodiment provides a method of paging at least one mobile station. The at least one mobile station includes a first mobile station. In accordance with the method, a page indicator is transmitted into a paging zone. A plurality of responses to the page indicator is received. The plurality of responses includes a first-mobile response from the first mobile station. A first-mobile location in the paging zone is determined based, at least in part, on the first-mobile response. A first-mobile page message is transmitted into the first-mobile location.

In a third principal aspect, an exemplary embodiment provides a system comprising: (1) a plurality of transceivers defining a plurality of wireless coverage areas for wireless communication with mobile stations and (2) a controller. The controller is configured to page a target mobile station by causing each of the transceivers to transmit an initial page message and, thereafter, causing a subset of the transceivers to transmit a supplemental page message.

DETAILED DESCRIPTION OF EXEMPLARY EMBODIMENTS

1. Introduction

The inventors have recognized that the conventional approach of paging a mobile station by transmitting a page message into a paging zone made up of multiple wireless coverage areas (such as cells or sectors) can be inefficient. In particular, the page message may occupy the paging channels of multiple wireless coverage areas where the intended mobile station is not located. In addition, multiple mobile stations that are not the intended recipient may use battery power to receive and decode the page message.

To address these inefficiencies, the inventors propose a two-stage method of paging a target mobile station. In the first stage, an initial page message is transmitted into an initial set of wireless coverage areas, such as the set of wireless coverage areas defined by a paging zone, in order to determine the target wireless coverage area where the target mobile station is currently operating. The initial page message may be a very short message, such as a page indicator, that does not identify the target mobile station. Thus, all of the mobile stations that receive the initial page message may transmit responses. The response from the target mobile station may be identified as the target response, for example, based on the presence of an identifier of the target mobile station, such as its mobile directory number (MDN), in the response. The wireless coverage area that received the target response may be identified as the target wireless coverage area.

In the second stage, after the target wireless coverage area has been determined, a supplemental page message is transmitted into a subset of the initial set of wireless coverage areas. The subset may include only the target wireless coverage area, or the subset may include the target wireless coverage area and one or more neighboring coverage areas. The supplemental page message may be longer than the initial page message and may include the information contained in a conventional page message. For example, the supplemental page message may identify the target mobile station (such as by MDN) and may also identify the reason for the page. For example, if the wireless network is paging the target mobile station in order to connect an incoming call, the supplemental page message may identify the incoming call and may include the calling party's number.

This two-stage paging method may beneficially use paging channel resources more efficiently. By transmitting a very short initial page message into the paging zone, the paging channels in the paging zone may be occupied for a much shorter period of time than if a conventional page message were transmitted. By thereafter transmitting a supplemental page message into only a subset of the paging zone, the target mobile station may receive the information that is contained in a conventional page message but without occupying all of the paging channels in the paging zone.

2. Exemplary Network Architecture

Figure 1:
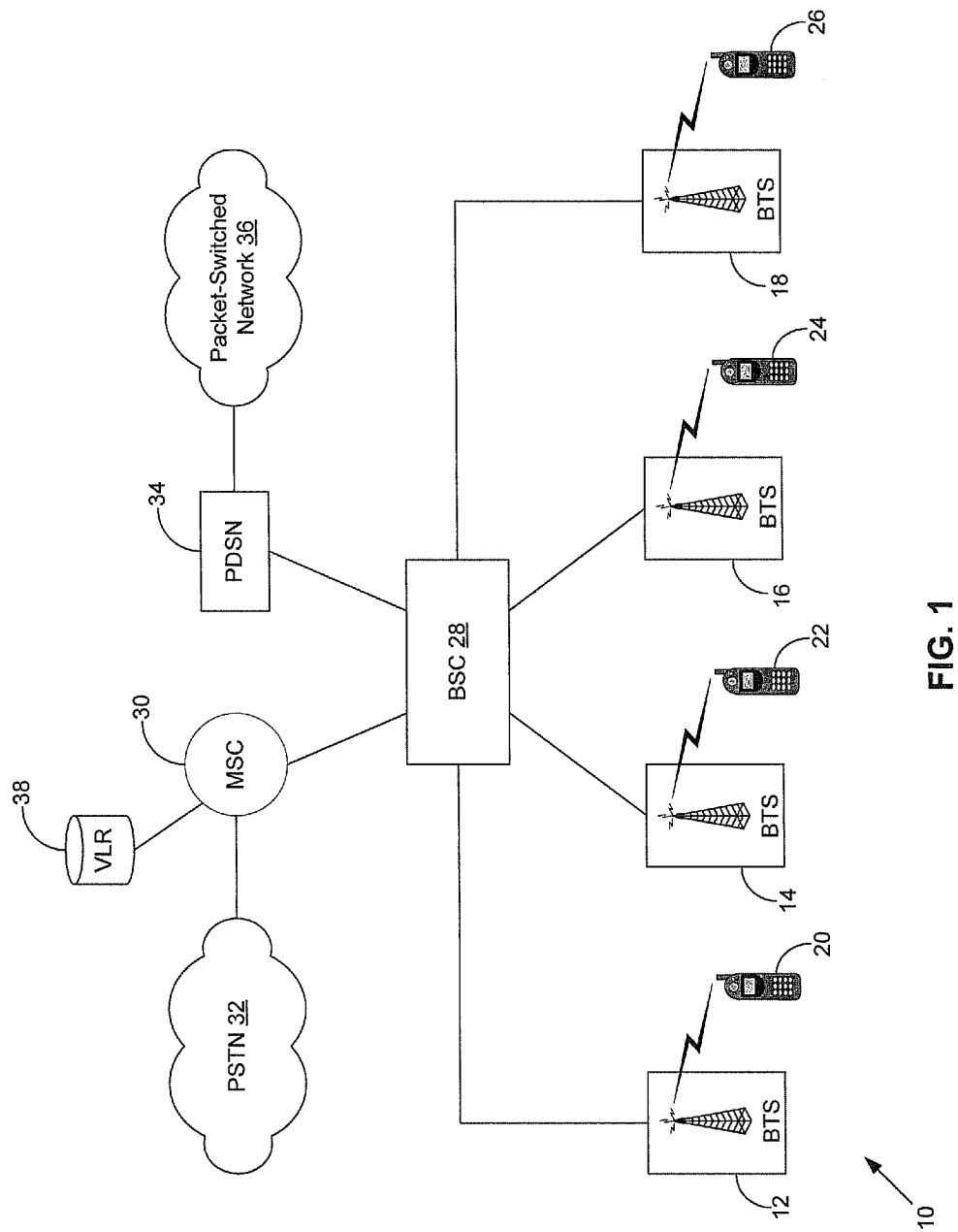
FIG. 1 is a block diagram of a wireless telecommunications network, in accordance with an exemplary embodiment.

FIG. 1 illustrates an exemplary wireless telecommunications network 10 in which exemplary embodiments may be employed. Network 10 includes a plurality of base transceiver stations (BTSs), exemplified in FIG. 1 by BTSs 12, 14, 16, and 18. Each BTS may be able to wirelessly communicate with mobile stations within a respective wireless coverage area or areas. In this regard, FIG. 1 shows BTSs 12, 14, 16, and 18 in wireless communication with mobile stations 20, 22, 24, and 26, respectively. Although FIG. 1 shows each BTS in communication with only one mobile station, it is to be understood that a BTS may be able to communicate with multiple mobile stations concurrently. In addition, each BTS may communicate with different mobile stations at different times. For example, mobile station 22 may begin communicating with BTS 14, as shown in FIG. 1, but may subsequently move to a different location where mobile station 22 communicates with BTS 12 instead.

Each BTS could provide a single wireless coverage area, such as a cell. Alternatively, each BTS could provide multiple wireless coverage areas, such as sectors. For example, each BTS could include three sets of transceivers and three sets of directional antennas in order to provide wireless coverage in three sectors. Although the extent of the wireless coverage areas provided by BTSs 12, 14, 16, and 18 is not shown in FIG. 1, it is to be understood that these wireless coverage areas could be separate, partially overlapping, or completely overlapping.

Mobile stations 20, 22, 24, and 26 could be wireless telephones, wireless personal digital assistants, wireless e-mail devices, wirelessly-equipped laptop computers, or other wireless communication devices. BTSs 12-18 and mobile stations 20-26 may communicate in accordance with an air interface protocol, such as 1xRTT CDMA, EVDO, GSM/GPRS, IEEE 802.11 (WiFi), or IEEE 802.16 (WiMAX). By using such air interface protocols, mobile stations 20-26 may engage in voice calls, data calls, or other types of communication via BTSs 12-18.

BTSs 12-18 may be controlled by a base station controller (BSC) 28, as shown in FIG. 1. BSC 28 may, in turn, be communicatively coupled to a mobile switching center (MSC) 30 that supports communications via the public switched telephone network (PSTN) 32. Alternatively, or additionally, BSC 28 may be communicatively coupled to a packet data serving node (PDSN) 34 that supports communications via a packet-switched network 36. Thus, network 10 may enable mobile stations 20-26 to send and receive calls via PSTN 32 and/or packet-switched network 36.

Although FIG. 1 shows network 10 with only one BSC, one MSC, and one PDSN, it is to be understood that network 10 could include additional BSCs, MSCs, and/or PDSNs. In addition, although BSC 28 is shown controlling four BTSs, a BSC may control either a greater or fewer number of BTSs. Further, MSC 30 may be communicatively coupled to multiple BSCs. Thus, MSC 30 may serve multiple BTSs through multiple BSCs.

Network 10 may also include a visitor location register (VLR) 38 communicatively coupled to, or integrated with, MSC 30. VLR 38 may store information regarding the mobile stations currently being served by MSC 30, including the last reported locations of those mobile stations. Instead of or in addition to VLR 38, network 10 may include one or more other databases that keep track of the current status of mobile stations. Such databases could be, for example communicatively coupled or integrated with BSC 28, PDSN 34, or accessible via packet-switched network 36.

The wireless coverage areas provided by BTSs 12-18 may make up a paging zone that is used to page mobile stations, for example, in response to incoming call requests from PSTN 32 or packet-switched network 36. More particularly, the paging zone may be defined as the set of BTSs controlled by a BSC, as the set of BTSs served by an MSC, or in some other manner. As described in more detail below, the paging zone may define the wireless coverage areas into which an initial page message is transmitted in order to reach a target mobile station. However, once the target mobile station is located, a supplemental page message may be transmitted into a subset of the paging zone. This two-stage paging process may be controlled by BSC 28, by MSC 30, or by some other control element in wireless telecommunications network 10.

3. Exemplary Operation

Figure 2:
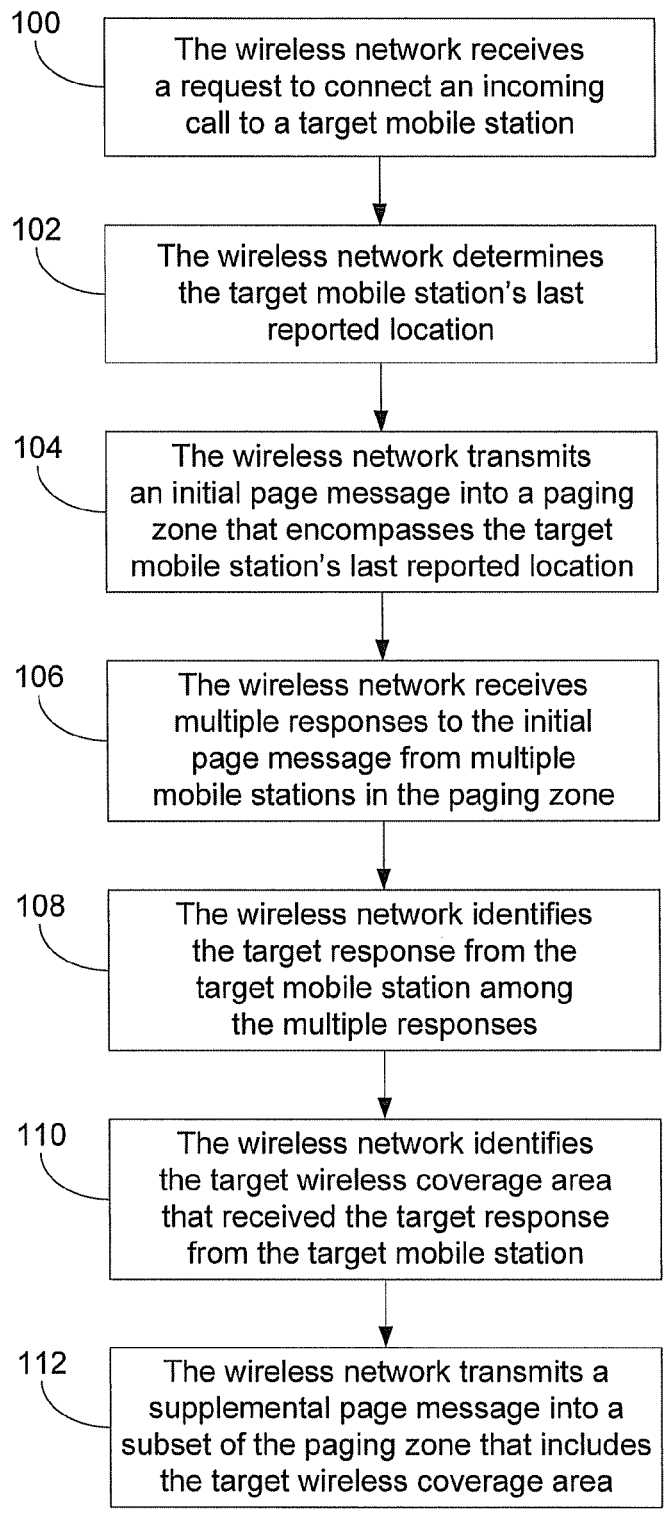
FIG. 2 is a flow chart illustrating a method of paging a target mobile station, in accordance with an exemplary embodiment.

FIG. 2 is a flow chart illustrating an exemplary two-stage paging method. For purposes of illustration, this exemplary method is described with reference to wireless telecommunications network 10 shown in FIG. 1. It is to be understood, however, that other network architectures could be used.

The method may begin when the wireless network receives a request to connect an incoming call to a target mobile station, as indicated by block 100. The request could be, for example, from PSTN 32 or packet-switched network 36. The request may identify the target mobile station, by its mobile directory number (MDN) or in some other manner, and may include an identification of the calling party, such as the calling party's directory number. The request may also include other information.

In response to the incoming call request, the wireless network may determine the target mobile station's last reported location, as indicated by block 102. To make this determination, the network may refer to VLR 38 or to some other database. The last reported location may correspond to the wireless coverage area that received the target mobile station's most recent transmission, which could be, for example, a registration request, a location update request, a call origination request, or other type of message. However, the target mobile station may have moved to a different location since its last reported location. For example, the target mobile station could be mobile station 24, which may be currently operating in a wireless coverage area of BTS 16, as shown in FIG. 1. But if mobile station 24 recently moved to BTS 16 from BTS 14, then the last reported location of mobile station 24 stored in VLR 38 may correspond to a wireless coverage area of BTS 14.

In order to account for the target mobile station's mobility, the wireless network may transmit an initial page message into a paging zone that encompasses multiple wireless coverage areas, including the target mobile station's last reported location, as indicated by block 104. The paging zone could be defined, for example, as the set of wireless coverage areas (cells or sectors) that are served by an MSC. Thus, in this example, the paging zone may include the wireless coverage areas of BTSs 12, 14, 16, and 18, as well as other wireless coverage areas served by MSC 30.

The initial page message may be a very short message that does not specifically identify the target mobile station. However, a slotted paging mode may be used to transmit the initial page message during a time slot being monitored by the target mobile station. In this regard, a particular slot cycle may be defined for the paging channels used in network 10, and the target mobile station may be configured to listen to the paging channel during only one or more preferred time slots in each slot cycle. For example, each time slot may be 80 milliseconds, and each slot cycle may be defined as 16 consecutive time slots. In that case, the target mobile station may listen to the paging channel every 16 slots (i.e., every 1.28 seconds). The particular time slot that a mobile station listens to in each slot cycle may be a parameter that is determined by the mobile station or the network, for example, by applying a hashing algorithm to the mobile station's MDN. Thus, the target mobile station (and other mobile stations that have been assigned to that time slot) may monitor a particular time slot during each slot cycle, while other mobile stations may monitor other time slots.

Preferably, the initial page message includes only minimal information so that it can be completely transmitted within one time slot. As a result, the initial page message might not include any identification of the target mobile station. However, the initial page message may be transmitted during one of the target mobile station's preferred time slots in order to minimize the number of other mobile stations that receive the initial page message.

The initial page message may be received by multiple mobile stations. For example, even though the initial page message may be transmitted during the target mobile station's preferred time slots, other mobile stations operating in the paging zone may also be monitoring that particular time slot. A mobile station that receives the initial page message may respond to it by transmitting a page response message in an access channel. Thus, the wireless network may receive multiple responses to the initial page message from multiple mobile stations in the paging zone, as indicated by block 106. For example, with the paging zone encompassing the wireless coverage areas of BTSs 12-18, network 10 may receive responses from mobile stations 20-26.

The wireless network then identifies the target response from the target mobile station from among the multiple responses, as indicated by block 108. The response from the target mobile station could be identified, for example, by the presence in the response of the MDN or other identifier of the target mobile station. The wireless network also identifies the target wireless coverage area that received the target response from the target mobile station, as indicated by block 110. For example, if mobile station 24 is the target mobile station, then network 10 may receive the target response from a sector of BTS 16 and may identify that sector as the target wireless coverage area.

The wireless network then transmits a supplemental page message into a subset of the paging zone that includes the target wireless coverage area, as indicated by block 112. The subset might be only the target wireless coverage area that the wireless network identified. Alternatively, the subset might consist of the target wireless coverage and one or more neighboring coverage areas. Neighboring coverage areas might be included because of the possibility that the target mobile station could move out of the target wireless coverage area before the supplemental page message is transmitted. Thus, if one of the three sectors of BTS 16 is identified as the target wireless coverage area where the target mobile station (mobile station 24) is currently located, network 10 may transmit the supplemental page message into that sector as well as one or more neighboring sectors (such as the other sectors of BTS 16 and one or more sectors of BTS 14 and BTS 18), rather than all of the sectors in the paging zone.

The supplemental page message may include an identification of the target mobile station, such as its MDN, and may include other information regarding the incoming call, such as the calling party number. Thus, the supplemental page message may be significantly longer than the initial page message. If a slotted paging channel is used, the wireless network may begin transmitting the supplemental page message during one of the time slots monitored by the target mobile station (multiple time slots may be required to complete the transmission).

Alternatively, the wireless network may transmit the supplemental page message within a preset period of time after transmitting the initial page message. This may be done in order to allow the other mobile stations that received the initial page message to "time out." For example, when a mobile station receives an initial page message, the mobile station may continue monitoring the paging channel for a preset period of time. If the mobile station does not receive a supplemental page message intended for it within that preset period of time, then the mobile station may go back to monitoring only its preferred time slots.

In this way, the wireless network may transmit a relatively short initial page message into a relatively large area (a paging zone), in order to locate the target mobile station, and then transmit a longer, supplemental page message into a much smaller area in order to provide the target mobile station with information regarding the incoming call. It is to be understood that the method described above with reference to FIG. 2 is exemplary only, as many variations on this method are possible. For example, in the exemplary method of FIG. 2, the same paging channel is used to transmit both the initial page message and the supplemental page message. Alternatively, different paging channels could be used. For example, the wireless network might transmit the supplemental page message in a conventional paging channel after transmitting the initial page message in a separate page indicator channel.

Figure 3:
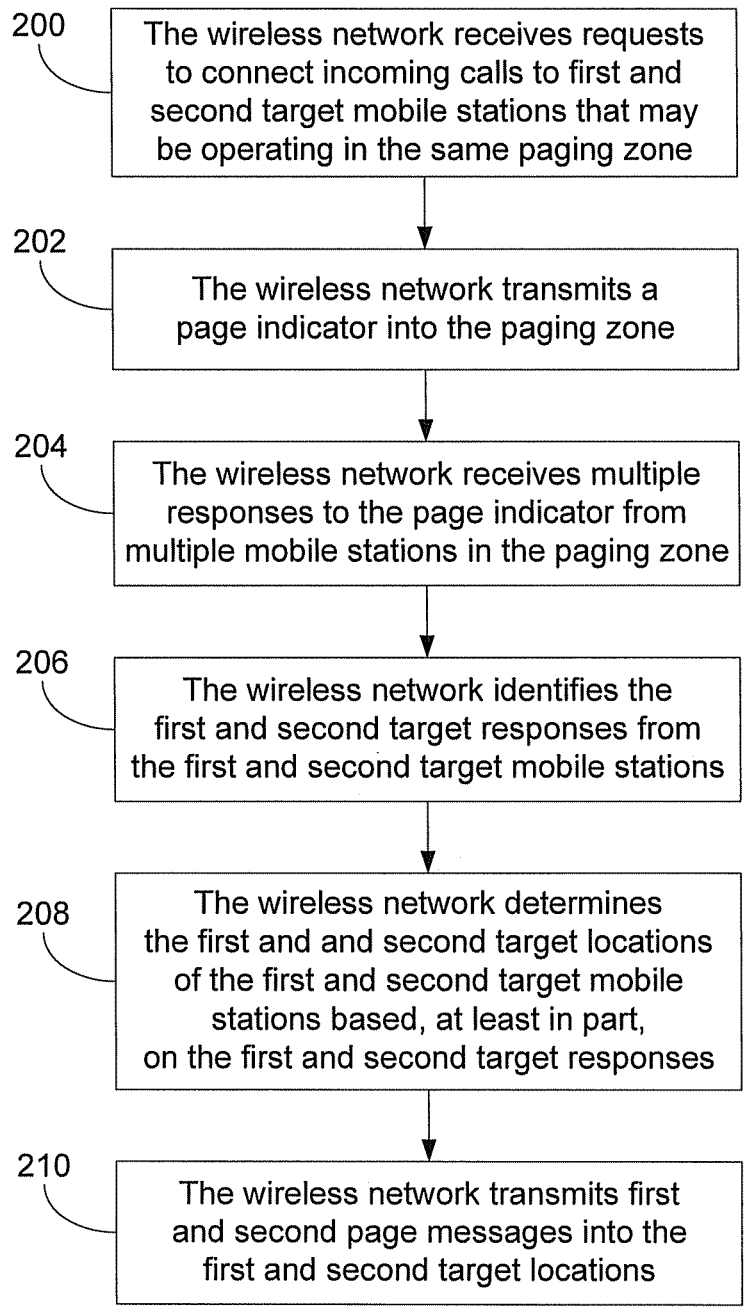
FIG. 3 is a flow chart illustrating a method of paging first and second target mobile stations, in accordance with an exemplary embodiment.

In another variation on the exemplary method of FIG. 2, the wireless network might use an initial page message to begin the process of paging multiple mobile stations. An example of this approach is illustrated in FIG. 3.

The method may begin when the wireless network receives requests to connect incoming calls to first and second target mobile stations that may be operating in the same paging zone (e.g., based on the their last reported locations), as indicated by block 200. The wireless network then transmits a page indicator into the paging zone, as indicated by block 202. The page indicator may be very short message that does not identify the first and second target mobile stations as the intended recipients, but it may be transmitted so as to be able to reach both the first and second target mobile stations. For example, the wireless network may transmit the page indicator in a dedicated page indicator channel.

Multiple mobile stations, including the first and second target mobile stations and one or more other mobile stations, may receive the page indicator and transmit responses. Thus, the wireless network may receive multiple responses to the page indicator from multiple mobile stations in the paging zone, as indicated by block 204. The wireless network identifies, from among these multiple responses, the first and second target responses from the first and second target mobile stations, as indicated by block 206. The wireless network then determines the first and second target locations of the first and second target mobile stations based, at least in part, on the first and second target responses, as indicated by block 208. For example, the wireless network may determine which sectors received the first and second target responses transmitted by the first and second target mobile stations and then identify those sectors as the first and second target mobile stations' current locations.

The wireless network transmits first and second page messages into the first and second target locations, respectively, as indicated by block 210. For example, the wireless network may transmit the first page message into only the sector where the first target mobile station is currently located and may transmit the second page message into only the sector where the second target mobile station is currently located, as determined in block 208. Alternatively, the wireless network may transmit each page message into more than one sector. For example, the wireless network may transmit the first page message into the first target mobile station's current sector and one or more neighboring sectors.

The first and second page messages may identify the first and second target mobile stations as intended recipients and may include information regarding the mobile stations' respective incoming calls. Thus, the first and second page messages may be substantially longer than the page indicator.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of paging a target mobile station, said method comprising:
   a wireless network transmitting an initial page message into a plurality of wireless coverage areas;
   said wireless network receiving a plurality of responses to said initial page message from a plurality of mobile stations, said plurality of responses including a target response from said target mobile station;
   said wireless network determining that said target response was received from a target wireless coverage area; and
   in response to determining that said target response from said target mobile station was received from said target wireless coverage area, said wireless network transmitting a supplemental page message into said target wireless coverage area, wherein said supplemental page message is longer than said initial page message.

2. The method of claim 1, wherein said wireless network transmitting an initial page message into a plurality of wireless coverage areas comprises:
   said wireless network transmitting said initial page message in a time slot that is monitored by said target mobile station.

3. The method of claim 2, wherein said wireless network transmitting a supplemental page message into said target wireless coverage area comprises:
   said wireless network transmitting said supplemental page message in said time slot.

4. The method of claim 1, wherein said plurality of wireless coverage areas is a plurality of sectors defined by a paging zone.

5. The method of claim 1, wherein said plurality of responses comprises a plurality of acknowledgement messages.

6. The method of claim 1, wherein said supplemental page message includes an identification of said target mobile station.

7. The method of claim 6, wherein said initial page message does not include said identification of said target mobile station.

8. The method of claim 1, wherein said supplemental page message is transmitted into only a subset of said plurality of wireless coverage areas.

9. The method of claim 8, wherein said subset includes only said target wireless coverage area.

10. The method of claim 8, wherein said subset includes said target wireless coverage area and one or more neighboring wireless coverage areas.

11. The method of claim 1, further comprising:
    said wireless network receiving a request to connect an incoming call to said target mobile station, wherein said initial page message is transmitted in response to said request.

12. A method of paging at least at least one mobile station, said at least one mobile station including a first mobile station, said method comprising:
    a wireless network transmitting a page indicator into a paging zone;
    said wireless network receiving a plurality of responses to said page indicator, said plurality of responses including a first-mobile response from said first mobile station;
    said wireless network determining a first-mobile location in said paging zone based, at least in part, on said first-mobile response; and
    in response to determining said first-mobile location based, at least in part, on said first-mobile response, said wireless network transmitting a first-mobile page message into said first-mobile location, wherein said first-mobile page message is longer than said page indicator.

13. The method of claim 12, wherein said paging zone comprises a plurality of sectors.

14. The method of claim 13, wherein said first-mobile location is a current sector in which said first mobile station is currently operating.

15. The method of claim 14, wherein said wireless network transmitting a first-mobile page message into said first-mobile location comprises:
    said wireless network transmitting said first-mobile page message into said current sector but not into other sectors in said paging zone.

16. The method of claim 14, wherein said wireless network transmitting a first-mobile page message into said first-mobile location comprises:
    said wireless network transmitting said first-mobile page message into said current sector and one or more neighboring sectors but not into other sectors in said paging zone.

17. The method of claim 12, wherein said at least one mobile station further includes a second mobile station and wherein said plurality of responses further includes a second-mobile response from said second mobile station.

18. The method of claim 17, further comprising:
    said wireless network determining a second-mobile location in said paging zone based, at least in part, on said second-mobile response; and
    in response to determining said second-mobile location based, at least in part, on said second-mobile response, said wireless network transmitting a second-mobile page message into said second-mobile location, wherein said second-mobile page message is longer than said page indicator.

19. A system, comprising:
a plurality of transceivers defining a plurality of wireless coverage areas for wireless communication with mobile stations; and
a controller, wherein said controller is configured to page a target mobile station by causing each of said transceivers to transmit an initial page message and, thereafter, causing a subset of said transceivers to transmit a supplemental page message, wherein said supplemental page message is longer than said initial page message.

20. The system of claim 19, wherein said controller is further configured to determine said subset based, at least in part, on a response from said target mobile station to said initial page message.

* * * * *